(12) United States Patent  
Miyazaki (10) Patent No.: US 9,024,901 B2  
(45) Date of Patent: May 5, 2015

(54) INTERACTIVE WHITEBOARDS AND PROGRAMS

(75) Inventor: Hiroshi Miyazaki, Tokyo (JP)

(73) Assignee: Hitachi Solutions, Ltd., Tokyo (JP)

(*) Notice: Subject to any disclaimer, the term of this patent is extended or adjusted under 35 U.S.C. 154(b) by 146 days.

(21) Appl. No.: 13/818,397

(22) PCT Filed: Aug. 12, 2011

(86) PCT No.: PCT/JP2011/068435  
§ 371 (c)(1),  
(2), (4) Date: Feb. 22, 2013

(87) PCT Pub. No.: WO2012/026347  
PCT Pub. Date: Mar. 1, 2012

(65) Prior Publication Data  
US 2013/0154985 A1    Jun. 20, 2013

(30) Foreign Application Priority Data

Aug. 25, 2010  (JP) .................................. 2010-188085  
Jan. 13, 2011  (JP) .................................. 2011-004873

(51) Int. Cl.  
*G06F 3/041*    (2006.01)  
*G06F 3/033*    (2013.01)  
*G06F 3/0488*    (2013.01)  
*G06F 3/042*    (2006.01)  
*H04N 7/18*    (2006.01)

(52) U.S. Cl.  
CPC ............ *G06F 3/0412* (2013.01); *G06F 3/0488* (2013.01); *G06F 3/0418* (2013.01); *G06F 3/0421* (2013.01); *H04N 7/183* (2013.01)

(58) Field of Classification Search  
CPC ..... G06F 3/0412; G06F 3/0418; G06F 3/042; G06F 3/0421; G06F 3/03545; H04N 5/57–5/58; G09G 2360/144  
USPC ................... 345/156–183, 4–9; 715/700–866  
See application file for complete search history.

(56) References Cited

U.S. PATENT DOCUMENTS 5,420,607 A *  5/1995  Miller et al. ................... 345/156  
5,670,985 A *  9/1997  Cappels et al. ................ 345/601  
6,498,602 B1 * 12/2002  Ogawa .......................... 345/173  
7,692,639 B2 *  4/2010  Silverstein et al. ........... 345/179

(Continued)

FOREIGN PATENT DOCUMENTS

JP  2001-067183 A  3/2001  
JP  2002-278703 A  9/2002

(Continued)

*Primary Examiner* — Amr Awad  
*Assistant Examiner* — Roberto Flores  
(74) *Attorney, Agent, or Firm* — Mattingly & Malur, PC (57) ABSTRACT

Provided is a technique of correcting influences of optical environment to correctly recognize the color of an input object used for inputting of coordinates, and enabling automatic designation of a color to be used for drawing. A coordinate detection unit detects coordinates of an input object. Next, display light on the display plane in the vicinity of the coordinates is estimated from display data, and a correction value to remove influences of the display light is calculated. A captured image of an input object used for input operations on the display plane is extracted, and the color of the captured image is corrected with a display light correction value. Thereby, influences of the display light added to the input object are removed, enabling the original color of the input object to be identified.

13 Claims, 4 Drawing Sheets

(56) References Cited

U.S. PATENT DOCUMENTS

| | | |
|---|---|---|
| 7,791,597 B2 * | 9/2010 | Silverstein et al. ............ 345/179 |
| 2002/0145595 A1 * | 10/2002 | Satoh ............................. 345/173 |
| 2002/0163506 A1 * | 11/2002 | Matusis ......................... 345/173 |
| 2004/0017380 A1 * | 1/2004 | Kim et al. ..................... 345/600 |
| 2005/0166163 A1 * | 7/2005 | Chang et al. ................... 715/863 |
| 2006/0012839 A1 * | 1/2006 | Fukuda .......................... 358/518 |
| 2006/0164556 A1 * | 7/2006 | Samadani et al. ............. 348/649 |
| 2006/0190836 A1 * | 8/2006 | Ling Su et al. ............... 715/773 |
| 2009/0002344 A1 * | 1/2009 | Wilson et al. .................. 345/178 |
| 2009/0146975 A1 * | 6/2009 | Chang ............................ 345/179 |
| 2010/0199232 A1 * | 8/2010 | Mistry et al. ................... 715/863 |
| 2010/0323671 A1 * | 12/2010 | Jeong ........................... 455/414.1 |

FOREIGN PATENT DOCUMENTS

| | | |
|---|---|---|
| JP | 4266076 A | 5/2009 |
| JP | 2010-039607 A | 2/2010 |

* cited by examiner

INTERACTIVE WHITEBOARDS AND PROGRAMS

TECHNICAL FIELD

The present invention relates to interactive whiteboards (IWBs) capable of detecting, as two-dimensional coordinates on a display plane, a contact position of an input object with reference to the display plane or an operation position of an input object with reference to a detection plane set in front side of the display plane, and relates to a program executed on a computer configuring the system.

BACKGROUND ART

An interactive whiteboard (IWB) includes a display or a projector, a coordinate detection device that detects an input operation of an input object with reference to the display plane thereof and a computer that controls drawing processing based on the detected input operation and an operation of the overall system.

The coordinate detection device may be of a type detecting a position (contact position) where a predetermined or any input object directly touches the display plane or of a type optically detecting a position (operation position) where an input object enters a virtual detection plane set within a range of a few centimeters from the display plane. A typical example of the former type may be a touch panel, and a typical example of the latter type may be an infrared coordinate detection device. The coordinate detection device outputs a detected position as two-dimensional coordinates on the display screen. The computer converts the two-dimensional coordinates of the coordinate detection device into two-dimensional coordinates on an operating screen of the computer and draws an image on the operating screen of the computer as an object having a color and a thickness designated beforehand. Such an operating screen of the computer is provided to a user as the display plane of the display or the projector.

The interactive whiteboard (IWB) repeats the processing from the detection of coordinates by the coordinate detection device to the drawing on the operating screen of the computer several tens of times per second, thus providing a user an experience as if an operator directly wrote a text or a figure using the input object on the operating screen of the computer. In the case of interactive whiteboard (IWB) equipped with a function of processing an input operation using an input object equal to the operation using a mouse connected to a computer, the computer can be operated through the input operation of the input object with reference to the display plane.

Among the interactive whiteboards (IWBs), a system including a display plane of an operating screen of a computer integral with a coordinate detection device is called a touch panel type. Whereas, a system configured to project an operating screen of a computer to a coordinate detection plane via a projector connected to the computer is called a projection type. Another interactive whiteboard (IWB) available is configured to display an operating screen of a computer on a display plane of a not-projection type display connected to the computer and arranging an optically formed detection plane of a coordinate detection device in front side of the display plane.

PRIOR ART DOCUMENT

Patent Document

Patent Literature 1: JP Patent Application Publication (Kokai) No. 2001-67183
Patent Literature 2: JP Patent No. 4266076

SUMMARY OF THE INVENTION

Problems to be Solved by the Invention

Some interactive whiteboards (IWBs) are equipped with a function of detecting or identifying the color of an input object used for coordinate designation from a captured image of the input object and reflecting a result thereof on the drawing colors on the operating screen of the computer.

For instance, Patent Literature 1 discloses an interactive whiteboard (IWB) including an image capturing means having a color image capturing element that captures an image of a coordinate input region as a whole and a color information detection means that detects color information on a designated object extracted from the captured image on the basis of the captured image of the designated object. Patent Literature 2 discloses an interactive whiteboard (IWB) including a color identification means that identifies the color of a predetermined object designating an information input region from an image captured by a CCD (Charge Coupled Device) camera.

Optical environment to capture an image of an input object, however, is not always the same. Therefore, a method of directly identifying the color of an object from an image captured sometimes fails to identify the original color of the object correctly. For instance, in the case of a touch panel type interactive whiteboard (IWB), light emitted from the surface of the display may be illumination light of the input object, and in the case of a projection type interactive whiteboard (IWB), projection light from the projector may be illumination light of the input object. As a result, such illumination light superimposed on the input object may result in an image captured in a color different from the original color of the input object. A type of illumination light or the presence or not of outside light may be another factor of an image of the input object captured in a color different from the original color.

Then it is an object of the present invention to provide an interactive whiteboards (IWBs) capable of correcting the influences of optical environment superimposed on an input object used for an input operation on a captured image, thus enabling automatic setting of a drawing color at an original color of the input object.

Means for Solving the Problem

The present inventor proposes an interactive whiteboard (IWB) including the following units:

(a) a coordinate detection unit configured to detect, as two-dimensional coordinates on a display plane, a contact position of an input object with reference to the display plane or an operating position of the input object with reference to a detection plane set in front side of the display plane;

(b) an image-capturing unit configured to capture, as a color image, an image of a vicinity of at least a region where two-dimensional coordinates are detected, where a range where the coordinate detection unit can detect the two-dimensional coordinates is set as an imageable range;

(c) a display light correction value calculation unit configured to calculate a display light correction value to correct a variation in image color that is generated by light addition to an image of the input object, the light being from the display plane in a vicinity of the coordinates of the input object detected by the coordinate detection unit, the calculation being performed on a basis of a display color of the display plane in the vicinity of the detected coordinates;

(d) a background removal unit configured to extract an image of the input object only from the color image captured by the image-capturing unit;

(e) a color correction unit configured to correct color information of the image of the input object extracted by the background removal unit with the display light correction value;

(f) a color identification unit configured to identify a color of the image of the input object subjected to color correction by the color correction unit; and (g) a display control unit configured to draw an object having a color identified by the color identification unit and a predetermined size at the detected coordinates of the display plane.

The present inventor proposes a program that makes a computer configuring an interactive whiteboard (IWB) function as the following units, including:

(a) a coordinate detection unit configured to detect, as two-dimensional coordinates on a display plane, a contact position of an input object with reference to the display plane or an operating position of the input object with reference to a detection plane set in front side of the display plane;

(b) a display light correction value calculation unit configured to calculate a display light correction value to correct a variation in image color that is generated by light addition to an image of the input object, the light being from the display plane in a vicinity of the coordinates of the input object detected by the coordinate detection unit, the calculation being performed on a basis of a display color of the display plane in the vicinity of the detected coordinates;

(c) a background removal unit configured to extract an image of the input object only from the color image captured at at least a vicinity of a region where two-dimensional coordinates are detected;

(d) a color correction unit configured to correct color information of the image of the input object extracted by the background removal unit with the display light correction value;

(e) a color identification unit configured to identify a color of the image of the input object subjected to color correction by the color correction unit; and (f) a display control means that draws an object having a color identified by the color identification means and a predetermined size at the detected coordinates of the display plane.

MODES FOR CARRYING OUT THE INVENTION

Referring to the drawings, the following describes embodiments of the present invention. Note here that the below-described interactive whiteboards (IWBs) are just one example for description, and embodiments of the present invention are not limited to the following embodiments. The present invention further can include various embodiments such as the combination of all functions of the below-described interactive whiteboards (IWBs), the case including only a part of the functions, the case including a known technique added thereto and the case replacing a partial function with a known technique. In the following embodiments, various processing functions are described as a program to be executed on a computer. Instead, a part or all of the processing functions may be implemented through hardware.

(Configuration of Electronic Blackboard)

Figure 1:
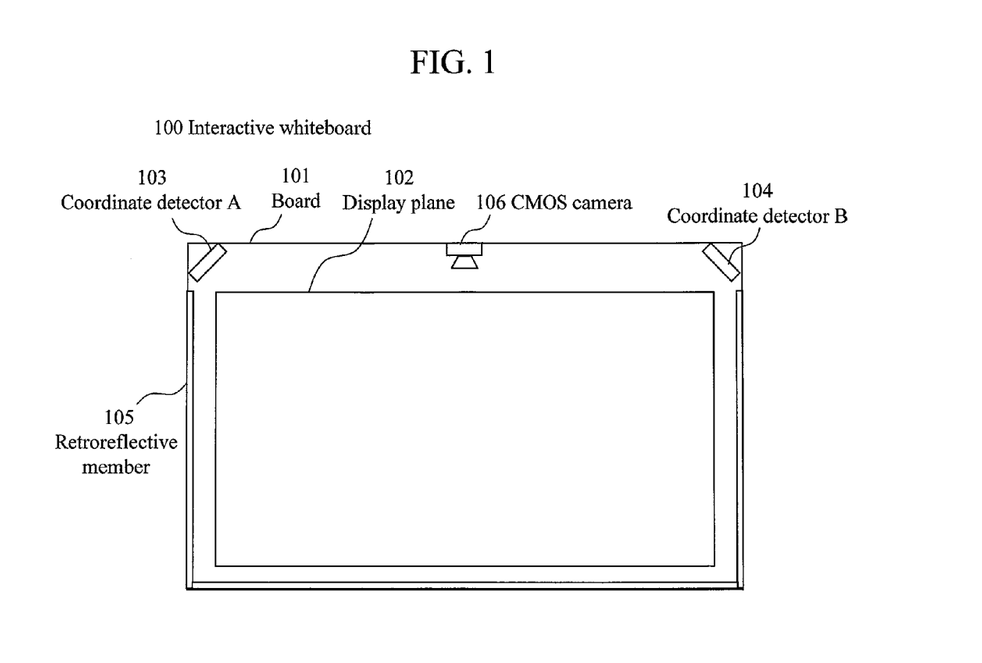
FIG. 1 describes an exemplary device arrangement on the periphery of an interactive whiteboard.

FIG. 1 illustrates an embodiment of an interactive whiteboard 100. The interactive whiteboard 100 of FIG. 1 represents the case using an optical coordinate detection method. In this example, infrared ray is used. The interactive whiteboards 100 of FIG. 1 uses a projector to display an image. That is, the following describes an interactive whiteboard (IWB) including the combination of an optical coordinate detection function and a projection-based image display function.

The interactive whiteboard 100 includes a flat board 101, to which a coordinate detector A 103, a coordinate detector B 104, a retroreflective member 105 and a CMOS camera 106 are attached. These accessories are all disposed at an outer edge part of the board 101. A central part of the board 101 is used as a display plane 102 to which projection light from a projector 210 (FIG. 2) is projected.

The coordinate detector A 103, the coordinate detector B 104 and the retroreflective member 105 make up a hardware portion of the coordinate detection device. The coordinate detector A 103 is arranged at an upper left corner of the board 101, and the coordinate detector B 104 is arranged at an upper right corner of the board 101. The retroreflective member 105 is a mirror or a tape member having a special structure capable of strongly reflecting light in the same direction as the incident direction. The retroreflective member 105 is disposed along three sides of the board 101 in a rectangular shape, including a left side, a right side and a lower side. The retroreflective member 105 has a reflective plane that is perpendicular to the surface of the board 101. Herein, the reflective plane is preferably achromatic-colored. The reflective plane preferably has a width enough to be image-captured as a background of an input object when the CMOS camera 106 captures an image of the input object. In this way, the retroreflective member 105 is used as a kind of background plate.

The coordinate detector A 103 and the coordinate detector B 104 are used to detect an input object (human's finger, hand, pen, stylus (pointer) or the like) approaching the vicinity above the display plane 102 or coming in contact with the display plane 102 and to detect two-dimensional coordinates so as to specify the position of the detected input object on the display plane. To this end, the coordinate detector A 103 and the coordinate detector B 104 each includes a LED emitting infrared ray and an image sensor receiving infrared ray reflected from the retroreflective member 105.

The LED emits infrared ray in the direction parallel to the display plane 102 and the image sensor captures an image of light reflected from the retroreflective member 105. The optical path plane of the infrared ray in this case becomes a detection plane of the coordinate detection device. In the case of this embodiment, the LED of the coordinate detector A 103 emits infrared ray at a wide angle so as to irradiate the overall range of the right side and the left side of the board 101. On the other hand, the LED of the coordinate detector B 104 emits infrared ray at a wide angle so as to irradiate the overall range of the left side and the lower side of the board 101.

Alternatively, an infrared ray beam may be scanned so as to irradiate the overall range of the display plane 102.

Figure 2:
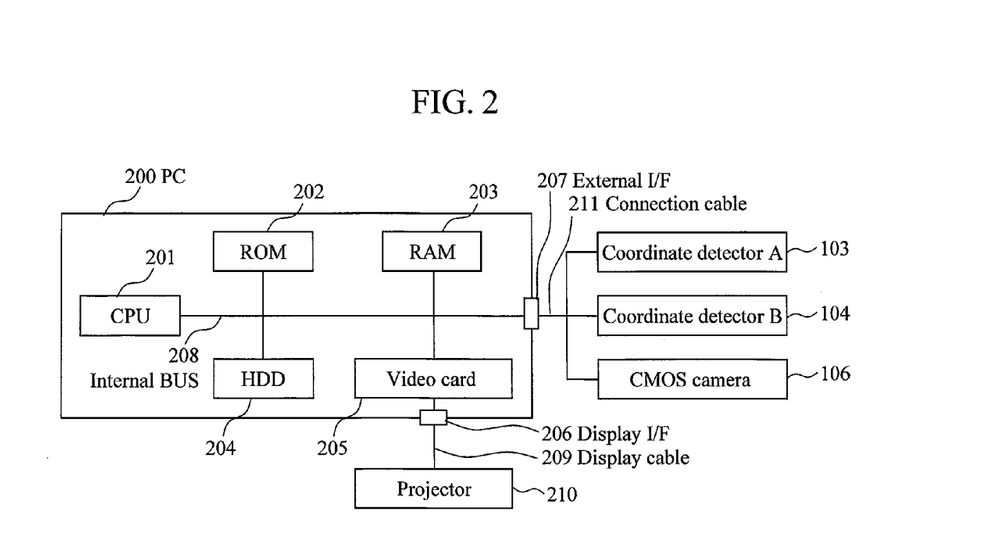
FIG. 2 describes an exemplary connection of a computer with peripheral devices.

This emission and reception of infrared ray are executed in accordance with a regular image-capturing instruction from a PC 200 (FIG. 2). Concurrently with the emission of infrared ray from each LED, the corresponding image sensor captures an image of the reflected light thereof and returns the captured image to the PC 200 (FIG. 2). In the case of this embodiment, a coordinate detection program of the PC 200 (FIG. 2) executes the calculation of detected coordinates of the emitted object. The PC 200 may be disposed on the casing of the interactive whiteboard or may be externally connected thereto. The detected coordinates are calculated using a triangulation technique. When the input object approaches or comes in contact with the display plane 102, the reflected light of infrared ray is interrupted, so that images captured by the coordinate detector A 103 and the coordinate detector B 104 become dark only in the direction where the input object is located on the optical path, and becomes bright in other parts. Accordingly, emission angle (incident angle) of the infrared ray can be found based on the dark position in the captured image. In this way, information on angles is obtained for each of the coordinate detector A 103 and the coordinate detector B 104, whereby the detected position (two-dimensional coordinates) of the input object can be calculated as an intersection of two optical axes. In another configuration, such a coordinate calculation function may be provided at the coordinate detector or on the board 101 side.

The CMOS camera 106 is provided in the vicinity of the center of the upper side of the board 101. Image-capturing by the CMOS camera 106 also is executed in accordance with an instruction from the PC 200 (FIG. 2). An image captured by the CMOS camera 106 is output to the PC 200 (FIG. 2).

Note here that the CMOS camera 106 is attached so as to enable image-capturing of the input object located close to the detection plane (display plane) as a color image. For instance, when the input object is in a pen-like shape, the CMOS camera 106 is attached so as to capture an image of a tip end portion of the pen. This is because the tip end portion of the pen is typically colored similar to the drawing color so as to match with user's experience. This is further because the tip end portion of the pen substantially coincedes with the detected coordinates, and the color of the object can be easily extracted irrespective of the size or the shape of the input object.

The captured image is desirably output from the CMOS camera 106 to the PC 200 (FIG. 2) as a digital signal. This is because the PC 200 (FIG. 2) processes a digital signal. Alternatively, when the PC 200 (FIG. 2) is equipped with a function of converting an image signal as an analogue signal to an image signal as a digital signal, the image may be output as an analogue signal. Although the present embodiment uses a camera provided with a CMOS image capturing element, the image capturing element may be a CCD or other image capturing elements.

The CMOS camera 106 is desirably provided so as to enable the capturing of an image of an input object located in the vicinity of the display plane 102 at least in the overall range of the display plane. The CMOS camera 106 is more desirably provided so as to enable the capturing of an image of the reflective plane of the retroreflective member 105 as background of the input object. This is for improving the detection accuracy of the input object. In the case of the present embodiment, the CMOS camera 106 used may have a fish-eye lens of about 180 degrees in angle of view. As illustrated in FIG. 1, the CMOS camera 106 is provided so as to direct the imaging direction downward and in parallel with the display plane 102.

However, as long as the aforementioned conditions are met, a CMOS camera of 90 degrees in angle of view may be provided in the vicinity of the coordinate detector A 103 and/or the coordinate detector B 104 so as not to impair their functions and so that the imaging direction of the camera is in parallel with the display plane 102. A plurality of CMOS cameras may be provided so that their image-capturing ranges as a whole cover the overall range of the display plane 102.

When the imaging ranges of the plurality of CMOS cameras provided overlap one another, one CMOS camera enabling capturing a larger image of the input object may be used depending on the coordinates of the input object detected by the coordinate detector A 103 and the coordinate detector B 104, and the captured image may be sent to the PC 200 (FIG. 2). Even in this case, all of the CMOS cameras may capture an image of the input object at the same time, and all of the images captured by the CMOS cameras may be sent to the PC 200 (FIG. 2).

(Internal Configuration of Computer)

FIG. 2 illustrates the internal configuration of the PC 200 connected to the interactive whiteboard 100 and connections to peripheral devices. The PC 200 includes a CPU 201, a ROM 202, a RAM 203, a HDD 204, a video card 205, a display interface (I/F) 206, an external interface (I/F) 207 and an internal bus 208.

Figure 3:
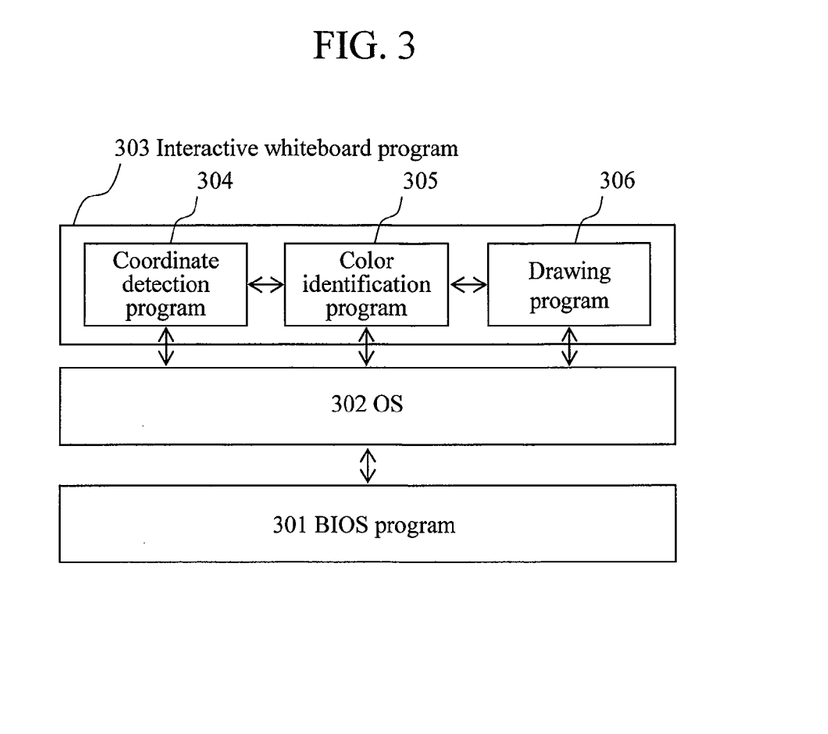
FIG. 3 describes a logic configuration of a program to implement an interactive whiteboard (IWB).

The CPU 201 is an operating device to execute a BIOS program 301 (FIG. 3), an OS 302 (FIG. 3) and an interactive whiteboard program 303 (FIG. 3). The ROM 202 is a region to record the BIOS program 301 that is an operating procedure for startup of the PC 200 and a basic control procedure of various types of hardware that are internal and external of the PC 200. The RAM 203 is a region to temporarily store the BIOS program 301, the OS 302, the interactive whiteboard program 303 and other programs as well as images captured by the coordinate detector A 103, the coordinate detector B 104 and the CMOS camera 106, their processing results and the like. The HDD 204 is a region to record the OS 302 and the interactive whiteboard program 303. The video card 205 is a device to calculate display data for temporal storage and output the same to the display (the projector 210 in FIG. 2). The display I/F 206 is an interface connecting the video card 205 with the display. The external I/F 207 is an interface connecting various devices making up the interactive whiteboard 100 with the PC 200. The internal bus 208 is used for exchange of data among 201 to 207.

The PC 200 executes the operation as follows. When the power supply of the PC 200 is activated, the CPU 201 reads the BIOS program 301 from the ROM 202 for execution. Subsequently, the CPU 201 copies the OS 302 and the interactive whiteboard program 303 from the HDD 204 to the RAM 203 for execution one by one. The CPU 201 executes the BIOS program 301, the OS 302 and an output command to the display included in the interactive whiteboard program 303 and sends a drawing command and drawn data to the video card 205. The video card 205 calculates the drawn data based on the drawing command, temporarily stores the calculation result as display data, and transmits the data as display data to the display connected to the display I/F 206 for display. The CPU 201 executes the BIOS program 301, the OS 302 and an operation command of the interactive whiteboard 100 included in the interactive whiteboard program 303, sends a predetermined instruction to the interactive whiteboard 100 via the external I/F 207, receives a processing result of the instruction and makes the RAM 203 temporarily store the processing result.

The projector 210 as a display is connected to the PC 200 via a display cable 209, and projects display data sent from the PC 200 via the cable on the display plane 102 of the interactive whiteboard 100.

The coordinate detector A 103, the coordinate detector B 104, and the CMOS camera 106 constituting the interactive whiteboard 100 are connected to the PC 200 via a connection cable 211, and perform processing such as image-capturing in accordance with a predetermined instruction sent from the CPU 201 via the cable and returns a processing result thereof.

(Programs)

FIG. 3 illustrates a logic configuration of the BIOS program 301, the OS 302 and the interactive whiteboard program 303 that are executed on the PC 200. Needless to say, FIG. 3 selectively shows the configuration of the programs relating to the description of the present invention only, and actually various application programs may be executed as needed.

The BIOS program 301 describes an operating procedure for startup of the PC 200 and a basic control procedure of various types of hardware that are internal and external of the PC 200. The OS 302 is an operating system of the PC 200 to abstract various types of hardware that are internal and external of the PC 200 and operate the hardware in accordance with an instruction from an application program. For instance, the OS 302 may make the projector 210 project display data, make the CMOS camera 106 or the like of the interactive whiteboard 100 capture an image and receive the captured image.

The interactive whiteboard program 303 is an application program running on the OS 302, including a coordinate detection program 304, a color identification program 305 and a drawing program 306.

The coordinate detection program 304 is a program to detect coordinates of an input object with reference to the interactive whiteboard 100. This program is configured to regularly issue an image capturing instruction to the coordinate detector A 103 and the coordinate detector B 104 and when the image returned includes an image of the input object, examine the orientation thereof based on the respective images. The coordinate detection program 304 is further configured to calculate two-dimensional coordinates of a position where the input object approaches or comes in contact with the display plane 102 by using a horizontal distance between the two coordinate detectors measured and set beforehand and a triangulation technique, and informs the color identification program 305 and the drawing program 306 of the result.

The color identification program 305 is a program to identify the color of an input object with reference to the interactive whiteboard 100. This program is configured to regularly issue an image capturing instruction to the CMOS camera 106 and cut out only the image region of the reflective plane of the retroreflective member 105 from the returned image. When the cut image includes an image of the input object, the color identification program 305 corrects the color thereof in accordance with optical environment during image capturing and informs the drawing program 306 of the corrected color as the color of the input object. Herein, the region of the retroreflective member 105 only may be cut from the captured image by manually setting the range of coordinates of the reflective plane of the retroreflective member 105 captured in the image or by applying a color or a pattern (a single achromatic color, a stripe pattern including a certain color and the complementary color thereof or the like) to the reflective plane of the retroreflective member 105 to process the processed image (differentiating based on a difference in saturation from the surrounding), which are not limiting methods.

The drawing program 306 is a program to generate display data as if a line or a text was drawn on the display plane 102 of the interactive whiteboard 100 with the input object. Receiving coordinates of the input object from the coordinate detection program 304, the drawing program 306 converts such coordinates into a coordinate system to be used for generation of display data. Within a certain time elapsed after the drawing last time, the drawing program 306 determines to connect the drawing coordinates last time with the drawing coordinates this time with a straight line, and draws the track of operation with the input object in the color of the input object received from the color identification program 305 and at a predetermined thickness. In other cases, the drawing program 306 temporarily stores the coordinate after conversion until the drawing next time. As a result, as the input object moves while being in contact with the display plane 102, display data generated includes a line coinciding with the track of the detected coordinates, which is projected from the projector 210 to the display plane 102.

(Color Balance Function)

Figure 4:
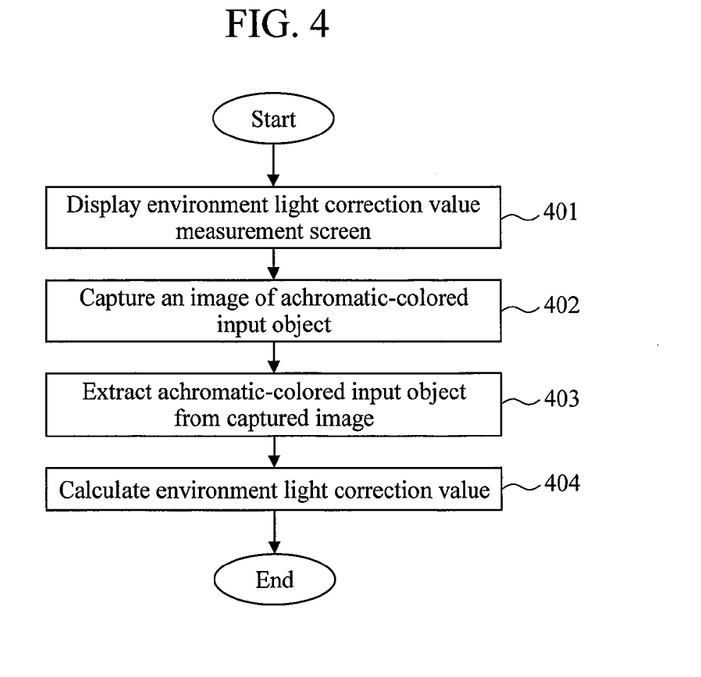
FIG. 4 describes a procedure relating to adjustment of color balance of a color identification program.

The following describes a preferable color balance function to be executed prior to the use of the interactive whiteboard 100. FIG. 4 illustrates an exemplary procedure of a program for the color balance. This program is to find an environment light correction value to correct the color of a captured image of an input object. This program starts automatically at the startup of the interactive whiteboard program 303 or in response to a request from a user of the interactive whiteboard (IWB). This program is implemented as a part of the color identification program 305.

At Step 401, the color identification program 305 creates display data of a screen for measurement of an environment light correction value, and requests the OS 302 to display the data. Thereby, the screen for measurement of an environment light correction value is projected from the projector 210 to the display plane 102. Herein the screen for measurement of an environment light correction value is a screen to be used for correction of color balance of a subject, which is a white screen all over the surface thereof, for example. The screen for measurement of an environment light correction value may include a figure in an achromatic color indicating a reference position to bring an achromatic-colored input object into contact with the display plane 102.

At Step 402, the color identification program 305 instructs the CMOS camera 106 to capture an image of an achromatic-colored input object, and receives an image thereof. The achromatic-colored input object refers to an input object in an achromatic-color (reference color) applied thereto that is used to precisely detect color information included in environment light. For instance, an absolute white board (white reference) for color balance adjustment or an object having a similar function may be used for this purpose. The image-capturing instruction herein may be issued when the coordinate detection program 304 detects the achromatic-colored input object and conveys the coordinates thereof to the color identification program 305 or may be issued at constant time intervals. In the latter case, processing such as detection of a difference between images captured successively may be performed, whereby an image including the achromatic-colored input object can be selected.

At Step 403, the color identification program 305 removes a background portion from the captured image to extract the achromatic-colored input object only. This extraction processing may be performed by acquiring a difference from an image captured when the achromatic-colored input object is absent or by edge-extracting the image of the achromatic-colored input object to identify the range of the achromatic-colored input object. However, they are not limiting methods.

At Step 404, the color identification program 305 calculates an environment light correction value based on an average color of the extracted achromatic-colored input object and stores the same. The average color herein can be found, in the case of representation of a RGB model, for example, by calculating the total sum of each of R, G and B values for all pixels in the region occupied by the extracted achromatic-colored input object and dividing the total sum by the total number of pixels in the region. However, this is not a limiting example. The environment light correction value is a value for removing influences of the environment light such as illumination and outside light other than projection light from the projector 210 from the captured image. Letting that the RGB value of the average color is $C_{env}=(r, g, b)$, then the environment light correction value can be found as the normalized value $C'_{env}=(r, g, b)/|C_{env}|$. Herein, $|C_{env}|=sqrt(r*r+g*g+b*b)$ and sqrt denotes a square root. In this case, the value obtained by normalizing the average color is exemplified as the environment light correction value, which is not a limiting example.

(First Execution Procedure of Color Identification Program)

Figure 5:
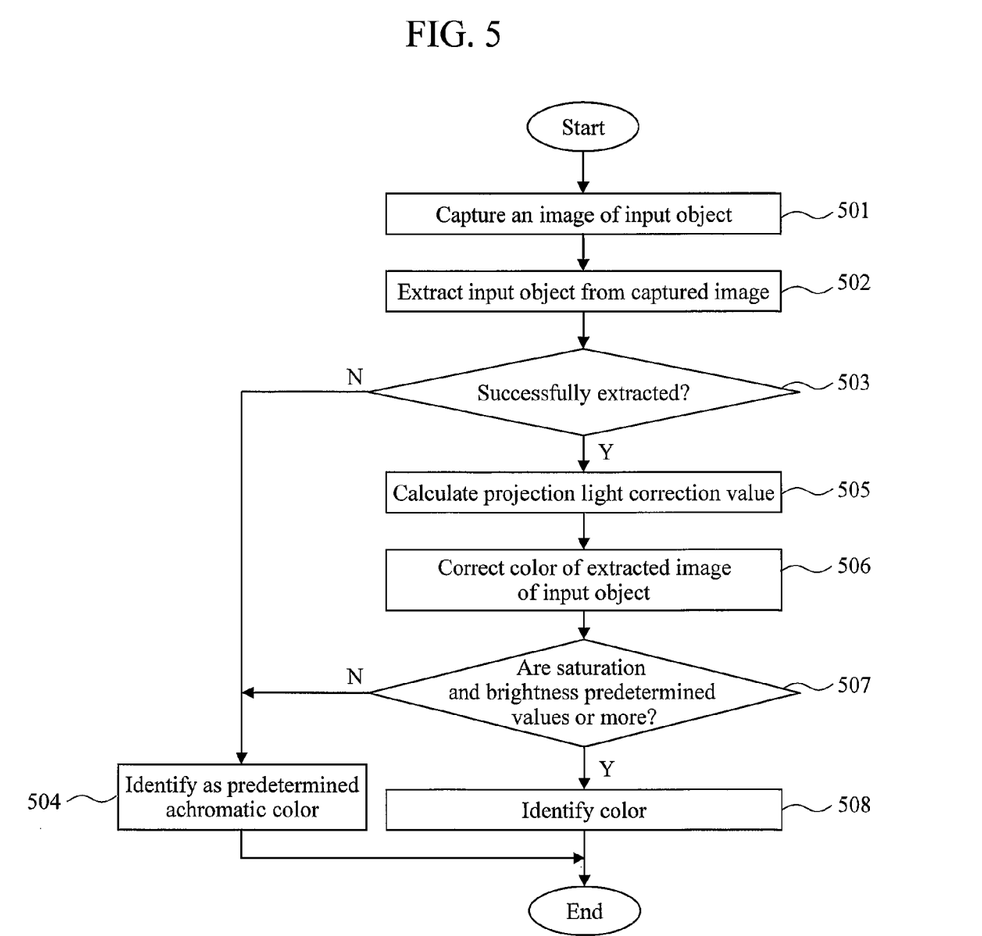
FIG. 5 describes a procedure relating to a main processing of a color identification program.

FIG. 5 illustrates an execution procedure of color identification processing by a color identification program used in the present embodiment. Color correction in this processing includes correction of influences of environment light and projection light from the projector 210 and identification of the original color of the input object. This processing is started after the coordinate detection program 304 detects coordinates of the input object.

At Step 501, the color identification program 305 instructs the CMOS camera 106 to capture an image of an input object and receives the captured image.

At Step 502, the color identification program 305 removes a background portion from the image captured at Step 501 to extract the input object only. In the case of the present embodiment, the input object is extracted by calculating the saturation and the brightness in the HSV (Hue, Saturation, Value) color space for each pixel of the captured image and keeping pixels with values of predetermined thresholds or more only. Herein, the extraction processing is not limited to this method, and the method described at Step 403 or other methods may be used.

At Step 503, the color identification program 305 determines whether the extracted image of the input object has a region of a predetermined size and shape or not. This is because noise may remain in the extracted image at the extraction processing of Step 502 due to influences of fluctuations of optical environment during image-capturing. For instance, the extracted portion with a size of about a few pixels has to be determined as a noise for removal. At this time, nothing may remain in the image after noise removal or a plurality of image regions of a predetermined size or more may remain. Then, when only one image region of a predetermined size or more remains, the extraction is determined as success, and then Step 505 is executed next, and otherwise the extraction is determined as failure, and Step 504 is executed next. When the input object is limited to a writing instrument of a predetermined thickness, the predetermined size may be a size of a minimum image region that can be captured at the furthermost position or the like of the display plane 102 from the CMOS camera, which can be found by measurement of an image of the input object coming in contact with the furthermost position captured beforehand or calculation. The predetermined shape can be determined by checking whether the fluctuations of the width (pixel number) of the extracted image remain in a constant range, for example.

At Step 504, the color identification program 305 identifies the color of the input object as a predetermined achromatic color to end the procedure.

At Step 505, the color identification program 305 calculates a correction value of projection light projected to the vicinity of the input object from the projector 210. The correction value of projection light is a correction value to remove the influences of the projection light projected to the vicinity of the input object from the image of the input object included in the captured image. The color identification program 305 acquires current display data from the OS 302, while acquiring coordinates of the input object from the coordinate detection program 304, and normalizes the average color of the display data in a certain range around these coordinates using the expression similar to Step 404, thus finding the correction value of projection light. In the following, the average color is called $C_{prj}$ and the correction value of projection color is called $C'_{prj}$.

Note that, in this embodiment, the normalized average color $C_{prj}$ is exemplified as the correction value of projection color $C'_{prj}$, which is not a limiting example. The range (the number of pixels around the detected coordinates) of the display data used for calculation of the average color $C_{prj}$ may be calculated based on the coordinate detection accuracy of the interactive whiteboard 100 and the interactive whiteboard program 303, a distance from the CMOS camera 106 to the input object that can be estimated from the coordinates, an allowable gradient of the input object with reference to the width of the retroreflective member 105 and the display plane 102 (assuming that the input object is in a rocket shape like a typical writing instrument, the gradient of the input object measured with reference to the vertical direction of the display plane 102) and the like as occasion demands, or may be set at a predetermined fixed value.

At Step 506, the color identification program 305 corrects the average color of the image of the extracted input object with the environment light correction value and the projection light correction value. A method for calculating the average color may be, but not limited to, the method described at Step 403, for example. Letting that the average color of the input object is $C_{in}$ and the normalized value thereof is $C'_{in}$, the corrected color of the input object $C''_{in}$ can be found by $C''_{in}=|C_{in}|\times C_{in}(C'_{env}\times C'_{prj})$, which is not a limiting example for the method of correcting colors.

At Step 507, the color identification program 305 finds the average values of saturation and brightness of the extracted image of the input object, and determines whether these values are predetermined threshold or more. If these conditions are met (if these values are the threshold or more), the color identification program 305 determines that the input object is in a chromatic color, and performs Step 508 next. If these conditions are not met, the color identification program 305 determines that the input object is in an achromatic color, and then performs Step 504 next.

At Step 508, the color identification program 305 identifies the color of the input object based on the corrected color of the input object, and informs the drawing program 306 of the color. The color can be identified by giving a feature (e.g., hue) of the color of a pen attached to the interactive whiteboard 100 to the color identification program beforehand and selecting the color closest to the corrected color of the input object, for example. Alternatively, the corrected color of the input object may be used as the identification color as it is.

(Summary of the First Execution Procedure)

As described above, in the present embodiment using the first execution procedure of the color identification program, the color of an input object is identified after correcting the influences of outside light (projection light and environment light) applied to the input object, whereby an object in the color matching with the recognition by a user of the interactive whiteboard can be drawn on the display plane.

For instance, assume the case where an input object in a certain color is brought close to the display plane of the interactive whiteboard for drawing. Even with the input object in the same color, when the projection color (display color) at the detection position of the drawing are different greatly in hue and saturation, it is easily expected that the color tone of the input object on the captured image varies from the original color tone. In conventional systems, the color of an input object is directly identified based on an image directly after capturing by a camera, and therefore the color tone of the object, even with the same input object, may vary depending on the drawing position. In the case of the present embodiment, however, the color of the input object is identified after the influences of the projection color (display color) and the influences of the environment color are removed, so that the color that a user of the interactive whiteboard recognizes can match with the identified color. Further, in the case of the present embodiment, since the input object is always drawn in the original color tone, the color tone of the object will not change depending on the drawing position as in the conventional systems. Needless to say, a result of the drawing can be left in the intended color tone as recording data of operations for input.

(Second Execution Procedure of Color Identification Program)

The following considers the case where an input object enters a shadow of a human or the like generated by a projection of light or an illumination of light. In this case, the input object will not be influenced by the projection light or the illumination light. On the other hand, the image of the input object will be captured dark. When the brightness of the input object decreases, other problems occur such that it becomes difficult to identify the color on the image screen, and additionally it becomes difficult to extract the input object itself.

Such problems can be solved by adjusting the exposure of a camera in the vicinity of detected coordinates using the coordinates of the input object detected by the coordinate detector A 103 and the coordinate detector B 104, for example. However, during adjustment of the exposure by this method, the position of the input object may be changed, and so necessary exposure may be changed. Therefore, it is difficult for this method to keep the correct exposure.

Then, in order to reduce the influences of the input object coming and going to/from a shadow of a human or a shadow of an object generated by the light from the surrounding light source, the following proposes a technique of conversion to reduce a brightness difference of the image as a whole captured by the CMOS camera 106, and extracting the input object from the converted image. Further proposed is a technique of determining the presence or not of superimposition of optical environment on the input object. Only when the superimposition is found, the aforementioned optical environment correction technique is used, and in other cases, the aforementioned optical environment correction technique is not used.

Figure 6:
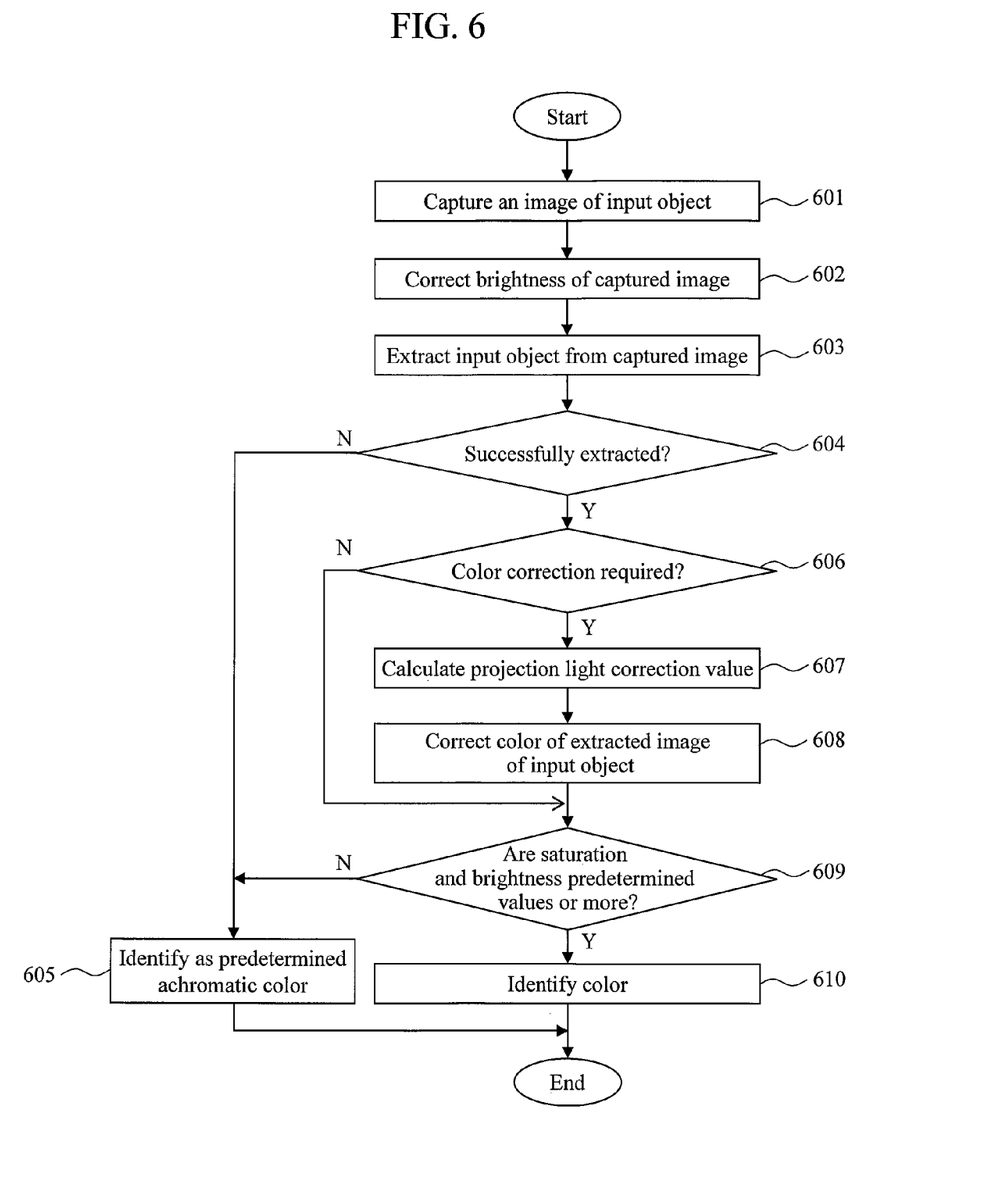
FIG. 6 describes a second procedure relating to main processing of a color identification program.

FIG. 6 illustrates an execution procedure of color identification processing by a color identification program used in the present embodiment. This processing is different from the first execution procedure in that the brightness of the captured image as a whole is corrected, and the necessity of color correction is determined. This processing is started after the coordinate detection program 304 detects coordinates of the input object.

At Step 601, the color identification program 305 instructs the CMOS camera 106 to capture an image of an input object and receives the captured image. The processing at Step 601 is the same as the processing at Step 501 of FIG. 5.

At Step 602, the color identification program 305 corrects RGB values of each pixel so as to reduce the brightness difference of the image as a whole that is captured at Step 601. The brightness correction processing here is image conversion processing to reduce the brightness difference among pixels so as not to change the hue values of the pixels in the captured image in the HSV color space. More specifically, the brightness is decreased in the region of higher brightness and the brightness is increased in the region of lower brightness. Such brightness correction processing corresponds to "brightness correction means" in claims.

In this specification, image conversion processing to reduce the brightness difference among pixels is also referred to as normalizing processing of RGB values of the pixels. As long as the aforementioned conditions are met, another technique of correcting brightness may be used. For instance, brightness of the pixels may be uniformed to a constant value without changing the hue values of the pixels. Such brightness correction processing allows the brightness of an input object to be increased even when the input object enters a shadow of a human or a shadow of an object generated by the light from the surrounding light source, thus increasing the possibility of successful extraction of the input object at Step 603.

At Step 603, the color identification program 305 removes a background portion from the image subjected to the brightness correction at Step 602 to extract the input object only. In the case of the present embodiment, the input object is extracted by calculating the saturation and the brightness in the HSV (Hue, Saturation, Value) color space for each pixel of the image subjected to the brightness correction and keeping pixels with values of predetermined thresholds or more only. Herein, the extraction processing is not limited to this method, and the method described at Step 403 or other methods may be used.

At Step 604, the color identification program 305 determines whether the image of the input object extracted at Step S603 after brightness correction has a region of a predetermined size and shape or not. This is because noise may remain in the extracted image at the extraction processing at Step 603 due to influences of fluctuations of optical environment during image-capturing. For instance, the extracted portion of about a few pixels in size has to be determined as noise for removal. At this time, nothing may remain in the image after noise removal or a plurality of image regions of a predetermined size or more may remain. Then, when only one image region of a predetermined size or more remains, the extraction is determined as success, and then Step 606 is executed next, and otherwise the extraction is determined as failure, and Step 605 is executed next. When the input object is limited to a writing instrument of a predetermined thickness, the predetermined size may be a size of a minimum image region that can be captured at the furthermost position or the like of the display plane 102 from the CMOS camera 106. The predetermined size can be found beforehand by measuring or calculating a captured image of the input object being in contact with the furthermost position. The predetermined shape can be determined by checking whether the fluctuations of the width (pixel number) of the extracted image remain in a constant range, for example.

At Step 605, the color identification program 305 identifies the color of the input object as a predetermined achromatic color to end the procedure. The processing at Step 605 is the same as the processing at Step 504 of FIG. 5.

At Step 606, the color identification program 305 determines whether or not the correction of environment light and projection light is required for the image of the input object, prior to the image being subjected to brightness correction. This determination processing means, in other words, whether or not the input object enters a shadow of a human or a shadow of an object during image-capturing of the input object at Step 601. Herein, when it is determined that the input object does not enter a shadow of a human or a shadow of an object, the color identification program 305 performs color correction processing at Step 607 and Step 608 and otherwise the color identification program 305 skips these steps and executes Step 609 next. Processing executed at this Step 606 is called in-shadow determination processing in this specification. This in-shadow determination processing corresponds to "in-shadow determination means" in claims.

In the case of the present embodiment, when it is determined that average brightness of a neighbor region not including the input object falls below average brightness in other regions by a predetermined value or more, the color identification program 305 determines that the input object enters a shadow of a human or a shadow of an object. In the case of the present embodiment, the determination processing is performed for the image before brightness correction. Alternatively, the determination processing may be performed for the image after brightness correction. The neighbor region refers to the range from a few pixels to a few tens pixels from the region of the input object, for example.

The criterion for determination is not limited to the above, and other criteria may be used for determination. For instance, when a bright region→a dark region→a bright region appear in this order in the direction from one end to the other end of the imaging screen of the CMOS camera 106 and when the input object extracted at Step 603 exists in the dark region, then the color identification program 305 may determine that the input object enters a shadow of a human or a shadow of an object.

At Step 607, the color identification program 305 calculates a correction value of projection light projected to the vicinity of the input object from the projector 210. The correction value of projection light is a correction value to remove the influences of the projection light projected to the vicinity of the input object from the input object in the captured image. The color identification program 305 acquires current display data from the OS 302, while acquiring coordinates of the input object from the coordinate detection program 304, and normalizes the average color of the display data in a certain range around these coordinates by the expression similar to Step 404, thus finding the correction value of projection light. In the following, the average color is called $C_{prj}$ and the correction value of projection color is called $C'_{prj}$.

Note that, in this embodiment, the normalized average color $C_{prj}$ is exemplified as the correction value of projection color $C'_{prj}$, which is not a limiting example. The range (the number of pixels around the detected coordinates) of the display data used for calculation of the average color $C_{prj}$ may be calculated based on the coordinate detection accuracy of the interactive whiteboard 100 and the interactive whiteboard program 303, a distance from the CMOS camera 106 to the input object that can be estimated from the coordinates, an allowable gradient of the input object with reference to the width of the retroreflective member 105 and the display plane 102 (assuming that the input object is in a rocket shape like a typical writing instrument, the gradient of the input object measured with reference to the vertical direction of the display plane 102) and the like as occasion demands, or may be set at a predetermined fixed value.

At Step 608, the color identification program 305 corrects the average color of the image of the input object, the image being subjected to the brightness correction, with the environment light correction value and the projection light correction value. The processing may be targeted for the image of the input object, the image being not yet subjected to brightness correction. A method for calculating the average color may be, but not limited to, the method described at Step 403, for example. Letting that the average color of the input object is $C_{in}$ and the normalized value thereof is $C'_{in}$, the corrected color of the input object $C''_{in}$ can be found by $C''_{in} = |C_{in}| \times C_{in}/(C'_{env} \times C'_{prj})$, which is not a limiting example C for the method of correcting colors.

At Step 609, the color identification program 305 finds the average values of saturation and brightness of the image of the input object subjected to color correction and brightness correction when color correction is performed thereto or of the input object subjected to brightness correction when color correction is not performed thereto, and determines whether these values are predetermined thresholds or more. If these conditions are met (if these values are the thresholds or more), the color identification program 305 determines that the input object is in a chromatic color, and performs Step 610 next. If these conditions are not met, the color identification program 305 determines that the input object is in an achromatic color, and then performs Step 605.

At Step 610, the color identification program 305 identifies the color of the input object based on the corrected color of the input object, and informs the drawing program 306 of the color. The color can be identified by giving a feature (e.g., hue) of the color of a pen attached to the interactive whiteboard 100 to the color identification program beforehand and selecting the color closest to the corrected color of the input object, for example. Alternatively, the corrected color of the input object may be used as the identification color as it is.

(Summary of the Second Execution Procedure)

As described above, in the present embodiment using the second execution procedure of the color identification program, brightness correction processing to reduce a brightness difference among pixels in the captured image is performed, followed by extraction of the input object. Therefore, even when the input object enters a shadow of a human or a shadow of an object generated by illumination light or projection light and an image thereof is captured dark, the input object can be easily extracted from the image captured by the CMOS camera 106.

Further, determination is made whether the input object is irradiated with illumination or projection light from the projector or whether the input object enters a shadow of a human or a shadow of an object, and only in the former case, color correction processing is performed, and in the latter case, unnecessary color correction processing is not performed. Thereby, color identification accuracy of the input object can be improved. In the case of the brightness correction processing of this procedure, the hue value of each pixel is not changed, and there is no influence on the identification accuracy of colors.

(Other embodiments)

In the above descriptions on the embodiments, coordinates of the interactive whiteboard are detected optically using a retroreflective member. Instead, other methods such as using a touch panel may be used for the present invention. When a touch panel type coordinate detection device is used, the coordinate detector A 103, the coordinate detector B 104 and the retroreflective member 105 used in the interactive whiteboard 100 of FIG. 1 can be eliminated. Even in the case of not using the retroreflective member 105, a background plate in an achromatic color, being captured as a background by the CMOS camera 106, is desirably provided instead of the retroreflective member 105 in order to facilitate identification and distinction of the color of the input object. That is, a background plate is desirably provided so as to protrude from the position surrounding the range where two-dimensional coordinates can be detected using the touch panel by a predetermined length in the direction perpendicular to the display plane toward the front direction of the display plane. When projection light is not used as in the case of using a touch panel, the projection light correction value in the aforementioned embodiment should be replaced with display light correction light. In the claims, the "display light correction value" is used in a broad sense containing the "projection light correction value".

Further in the above descriptions of the embodiments, a camera for capturing an image of the input object is attached integrally to the board 101. Instead, this type of camera may be retrofitted as an optional component. When a coordinate detection device is of a type that can be retrofitted to an existing blackboard (non-interactive whiteboard), a camera for image-capturing an input object may be attached to an upper part of a frame body.

EXPLANATION OF REFERENCE NUMERALS

100 . . . interactive whiteboard, 101 . . . board, 102 . . . display plane, 103 . . . coordinate detector A, 104 . . . coordinate detector B, 105 . . . retroreflective member, 106 . . . CMOS camera, 200 . . . PC, 201 . . . CPU, 202 . . . ROM, 203 . . . RAM, 204 . . . HDD, 205 . . . video card, 206 . . . display I/F, 207 . . . external I/F, 208 . . . internal bus, 209 . . . display cable, 210 . . . projector, 211 . . . connection cable, 301 . . . BIOS program, 302 . . . OS, 303 . . . interactive whiteboards program, 304 . . . coordinate detection program, 305 . . . color identification program, 306 . . . drawing program

The invention claimed is:

1. An interactive whiteboard, comprising:
a coordinate detection unit configured to detect, as two-dimensional coordinates on a display plane, a contact position of an input object with reference to the display plane or an operating position of the input object with reference to a detection plane set in front side of the display plane;
an image-capturing unit configured to capture, as a color image, an image of a vicinity of at least a region where two-dimensional coordinates are detected, wherein a range where the coordinate detector can detect the two-dimensional coordinates is set as an imageable range;
a display light correction value calculation unit configured to calculate a display light correction value to correct a variation in image color that is caused by light addition to an image of the input object, the light being from the display plane in a vicinity of the coordinates of the input object detected by the coordinate detection unit, the calculation being performed on a basis of a display color of the display plane in the vicinity of the detected coordinates;
a background removal unit configured to extract an image of the input object only from the color image captured by the image-capturing unit;
a color correction unit configured to correct color information of the image of the input object extracted by the background removal unit with the display light correction value;
a color identification unit configured to identify a color of the image of the input object subjected to color correction by the color correction unit;
a display control unit configured to draw an object having a color identified by the color identification unit and a predetermined size at the detected coordinates of the display plane; and
an environment light correction value measurement screen display control unit configured to make the display plane display an environment light correction value measurement screen,
wherein:
when the coordinate detection unit detects the input object during displaying of the environment light correction value measurement screen by the environment light correction value measurement screen display control unit, the environment light correction value calculation unit calculates an environment light correction value to correct a variation in image color that is generated by addition of environment light on a basis of an image of an achromatic-colored input object having an achromatic range for reference, the image being extracted by the background removal unit, and
the color correction unit corrects the image of the input object on the basis of the environment light correction value and the display light correction value.

2. The interactive whiteboard according to claim 1, wherein:
when the background removal unit fails in background removal or when both or any one of a saturation and a brightness of the image of the input object after the color correction is in a predetermined determination range, the color identification unit identifies the color of the input object as any predetermined achromatic color.

3. The interactive whiteboard according to claim 1, further comprising:
a background plate to be imaged as a background of the input object when the image-capturing unit captures an image of the input object,
wherein:
the background plate protrudes by a predetermined length in a direction perpendicular to the display plane toward a front direction from a position surrounding a range where the coordinate detection unit can detect two-dimensional coordinates.

4. The interactive whiteboard according to claim 3, wherein the background plate is a predetermined achromatic color.

5. The interactive whiteboard according to claim 1, further comprising:
a brightness correction unit configured to reduce a brightness difference without changing hue of pixels in the color image captured by the image-capturing unit; and
an in-shadow determination unit configured to determine whether or not the input object enters a shadow in the color image captured by the image-capturing unit,
wherein:
the background removal unit extracts an image of the input object only from the color image subjected to brightness correction by the brightness correction unit, and the color correction unit performs predetermined color correction only when the in-shadow determination unit determines that the input object does not enter a shadow.

6. The interactive whiteboard according to claim 1, wherein
when the background removal unit fails to extract the image of the input object or when either of a saturation or a brightness of the image of the input object after the color correction are less than a predetermined value, the color identification unit identifies the color of the input object as any predetermined achromatic color.

7. The interactive whiteboard according to claim 1, further comprising:
a background plate to be imaged as a background of the input object when the image-capturing unit captures an image of the input object, wherein
the background plate protrudes by a predetermined length in a direction perpendicular to the display plane toward a front direction from a position surrounding a range where the coordinate detection unit can detect two-dimensional coordinates.

8. The interactive whiteboard according to claim 1, further comprising:
a brightness correction unit configured to reduce a brightness difference without changing hue of pixels in the color image captured by the image-capturing unit; and
an in-shadow determination unit configured to determine whether or not the input object enters a shadow in the color image captured by the image-capturing unit,
wherein:
the background removal unit extracts an image of the input object only from the color image subjected to brightness correction by the brightness correction unit, and
the color correction unit performs predetermined color correction only when the in-shadow determination unit determines that the input object does not enter a shadow.

9. A non-transitory, computer readable medium with instructions stored thereon that, when executed by a computer configuring an interactive whiteboard, instruct the computer to function as the following units, comprising:
a coordinate detection unit configured to detect, as two-dimensional coordinates on a display plane, a contact position of an input object with reference to the display plane or an operating position of the input object with reference to a detection plane set in front side of the display plane;
a display light correction value calculation unit configured to calculate a display light correction value to correct a variation in image color that is generated by light addition to an image of the input object, the light being from the display plane in a vicinity of the coordinates of the input object detected by the coordinate detection unit, the calculation being performed on a basis of a display color of the display plane in the vicinity of the detected coordinates;
a background removal unit configured to extract an image of the input object only from the color image captured in least a vicinity of a region where two-dimensional coordinates are detected;
a color correction unit configured to correct color information of the image of the input object extracted by the background removal unit with the display light correction value;
a color identification unit configured to identify a color of the image of the input object subjected to color correction by the color correction unit;
a display control unit configured to draw an object having a color identified by the color identification unit and a predetermined size at the detected coordinates of the display plane; and
an environment light correction value measurement screen display control unit configured to make the display plane display an environment light correction value measurement screen,
wherein:
when the coordinate detection unit detects the input object during displaying of the environment light correction value measurement screen by the environment light correction value measurement screen display control unit, the environment light correction value calculation unit calculates an environment light correction value to correct a variation in image color that is generated by addition of environment light on a basis of an image of an achromatic-colored input object having an achromatic range for reference, the image being extracted by the background removal unit, and
the color correction unit corrects the image of the input object on the basis of the environment light correction value and the display light correction value.

10. The non-transitory, computer readable medium according to claim 9, wherein:
when the background removal unit fails in background removal or when both or any one of a saturation and a brightness of the image of the input object after the color correction is in a predetermined determination range, the color identification unit identifies the color of the input object as any predetermined achromatic color.

11. The non-transitory, computer readable medium according to claim 9, with instructions stored thereon that, when executed by the computer, further instruct the computer to function as the following units, comprising:
a brightness correction unit configured to reduce a brightness difference without changing hue of pixels in the color image captured by the image-capturing unit; and
an in-shadow determination unit configured to determine whether or not the input object enters a shadow in the color image captured by the image-capturing unit,
wherein:
the background removal unit extracts an image of the input object only from the color image subjected to brightness correction by the brightness correction unit, and
the color correction unit performs predetermined color correction only when the in-shadow determination unit determines that the input object does not enter a shadow.

12. The non-transitory, computer readable medium according to claim 9, wherein:
when the background removal unit fails to extract the image of the input object or when either of a saturation or a brightness of the image of the input object after the color correction are less than a predetermined value, the color identification unit identifies the color of the input object as a predetermined achromatic color.

13. The non-transitory, computer readable medium according to claim 9, with instructions stored thereon that, when executed by the computer, further instruct the computer to function as the following units, comprising:
a brightness correction unit configured to reduce a brightness difference without changing hue of pixels in the color image captured by the image-capturing unit; and
an in-shadow determination unit configured to determine whether or not the input object enters a shadow in the color image captured by the image-capturing unit, wherein:
the background removal unit extracts an image of the input object only from the color image subjected to brightness correction by the brightness correction unit, and
the color correction unit performs predetermined color correction only when the in-shadow determination unit determines that the input object does not enter a shadow.

* * * * *